United States Patent [19]

Toyoda et al.

[11] Patent Number: 5,371,516
[45] Date of Patent: Dec. 6, 1994

[54] PEN-TYPE COMPUTER INPUT DEVICE

[75] Inventors: Ryuichi Toyoda, Yokohama; Takeshi Masaki, Kawasaki; Kimikatsu Sato, Sagamihara; Akemi Shibuya, Kawasaki, all of Japan

[73] Assignee: Matsushita Electric Industrial Co., Ltd., Osaka, Japan

[21] Appl. No.: 2,510

[22] Filed: Jan. 8, 1993

Related U.S. Application Data

[63] Continuation of Ser. No. 569,131, Aug. 17, 1990, abandoned.

[30] Foreign Application Priority Data

| Aug. 18, 1989 | [JP] | Japan | 1-213382 |
| Aug. 18, 1989 | [JP] | Japan | 1-213383 |
| Aug. 23, 1989 | [JP] | Japan | 1-216341 |
| Nov. 20, 1989 | [JP] | Japan | 1-301703 |
| Feb. 22, 1990 | [JP] | Japan | 2-41761 |

[51] Int. Cl.$^5$ ............................. G09G 5/08
[52] U.S. Cl. ........................ 345/179; 345/163
[58] Field of Search ............ 178/18, 19; 340/706, 340/707, 709, 710; 250/221, 231.13, 231.14, 231.18; 345/157, 163, 164, 165, 179, 184

[56] References Cited

U.S. PATENT DOCUMENTS

| 3,269,190 | 8/1966 | Laman . |
| 3,304,434 | 2/1967 | Koster . |
| 3,395,589 | 8/1968 | Gersten . |
| 3,541,521 | 11/1970 | Koster . |
| 3,541,541 | 11/1970 | Engelbart . |
| 3,835,453 | 9/1974 | Narayanan . |
| 4,162,399 | 7/1979 | Hudson ............ 250/231.14 |

FOREIGN PATENT DOCUMENTS

| 0085960 | 8/1983 | European Pat. Off. . |
| 0143581 | 6/1985 | European Pat. Off. . |
| 8900269 | 7/1989 | Germany . |
| 0031637 | 2/1985 | Japan . |
| 0120424 | 6/1985 | Japan . |
| 0179820 | 9/1985 | Japan . |

Primary Examiner—Jeffery Brier
Attorney, Agent, or Firm—Lowe, Price, LeBlanc & Becker

[57] ABSTRACT

A pen-type computer input device is used to move a cursor on the display of a computer system or enter data such as of figures, letters, numerals, or the like into a computer system. The pen-type computer input device includes a shank, a ball rotatably supported on the tip end of the shank, a pair of rotatable members rotatable about X and Y axes extending perpendicularly to each other and held in rolling contact with the ball, and a rotation detector for detecting the direction in which the rotatable members rotate and the distance by which the rotatable members move. Since the rotation of the ball is directly transmitted to the rotatable members and the distance by which the rotatable members move is detected, the pen-type computer input device is small in size and can easily be handled.

19 Claims, 11 Drawing Sheets

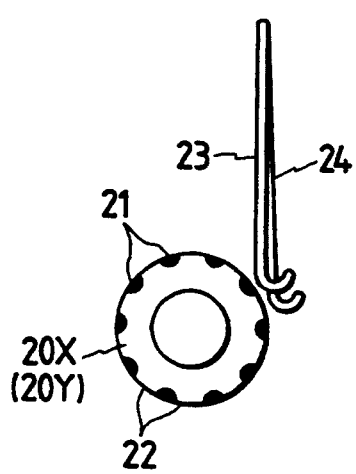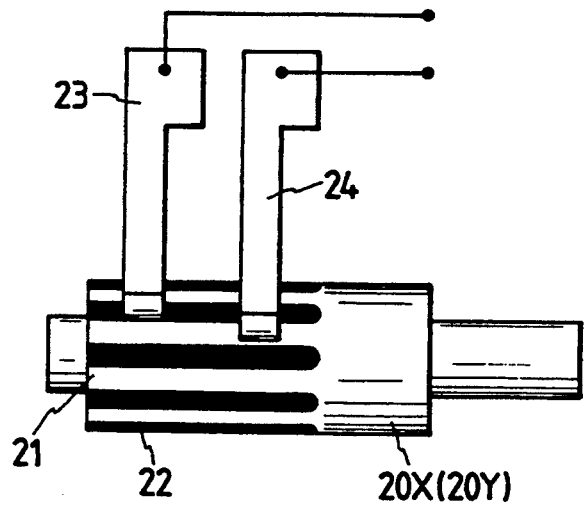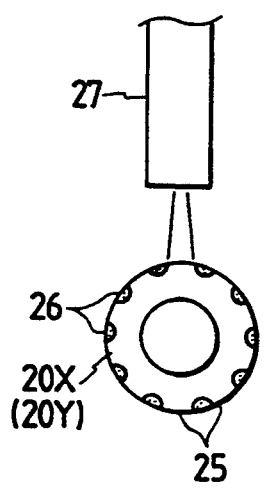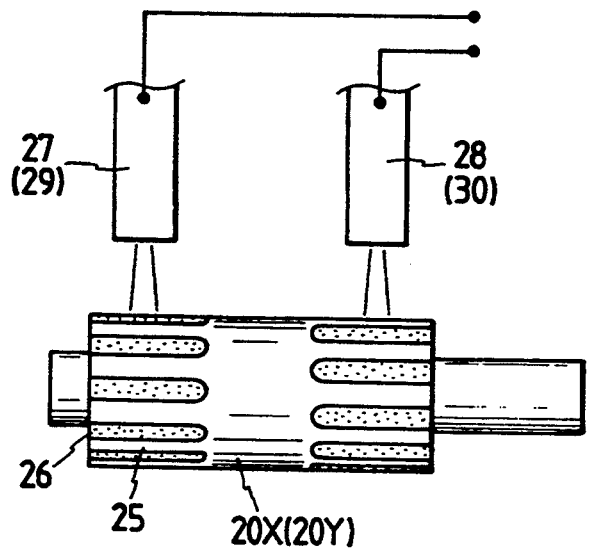

PEN-TYPE COMPUTER INPUT DEVICE

This application is a continuation of application Ser. No. 07/569,131 filed Aug. 17, 1990 now abandoned.

BACKGROUND OF THE INVENTION

The present invention relates to a pen-type computer input device for moving a cursor on the display of a computer system or entering data such as of figures, letters, numerals, or the like into a computer system.

Various computer input devices such as a keyboard, a mouse, a digitizer, a light pen, a tablet, etc. are used in the art of computers. The mouse is a device for relatively moving a cursor displayed on a CRT. The mouse can move the cursor at high speed and can also freely draw a figure or the like on the CRT display through relatively simple manual operation. Mouses now in use are largely classified into two groups. In one group, the mouse comprises a rotatably supported ball whose angular displacement is used to detect the distance which is traversed by the mouse. In the other category, the mouse is moved over a board which is marked with a checkerboard pattern, and the distance by which the mouse is moved is detected by a photosensor.

Mouses may be used in different ways depending on the software of computer systems with which the mouses are associated. Basically, when a desired figure or line is to be drawn using a mouse, the mouse is moved to move a cursor on a computer display along a path corresponding to such a figure or line. Since it is difficult to move a mouse over small distances because of its size and structure, and it is impossible to monitor any movement of the mouse directly, it is highly difficult to enter small figures, letters, and numerals through the mouse. The other conventional computer input devices are also incapable of entering small figures and free curves desirably.

SUMMARY OF THE INVENTION

In view of the aforesaid problems of the conventional computer input devices, it is an object of the present invention to provide a pen-type computer input device which is small in size, can easily be handled just like a writing implement, and hence can be used to enter figures, letters, numerals, etc. into a computer to which the input device is connected, in the exact pattern followed by the input device.

To achieve the above object, there is provided a pen-type computer input device comprising a shank having a tip end, a ball rotatably supported on the tip end, a pair of rotatable members rotatable about X and Y axes extending perpendicularly to each other and held in rolling contact with the ball, and detecting means for detecting the direction in which the rotatable members rotate and the distance by which the rotatable members move. Since the rotation of the ball is directly transmitted to the rotatable members and the distance by which the rotatable members move is detected, the pen-type computer input device is small in size and can easily be handled.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 9A and 9B are side and front elevational views, respectively, of a rotation detector of the pen-type computer input device according to the fourth embodiment;

FIGS. 10A and 10B are side and front elevational views, respectively, of a rotation detector of a pen-type computer input device according to a fifth embodiment of the present invention;

DETAILED DESCRIPTION

Figure 1:
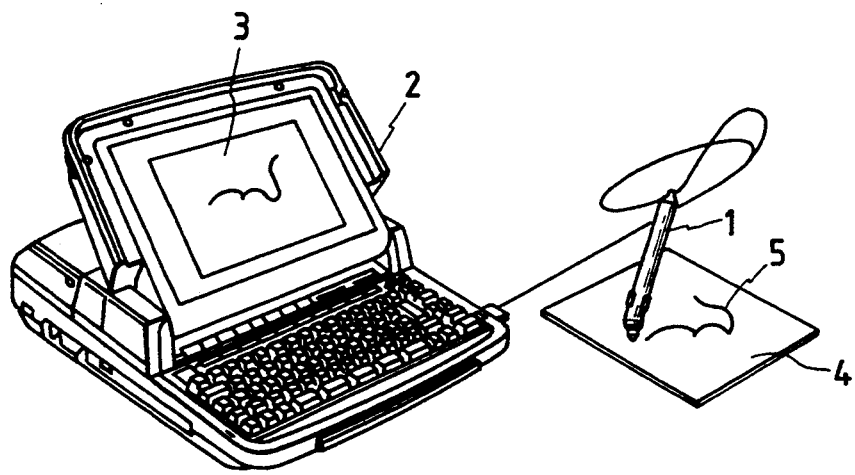
FIG. 1 is a perspective view of a pen-type computer input device according to a first embodiment of the present invention and a computer to which the pen-type computer input device is connected.
Figure 2:
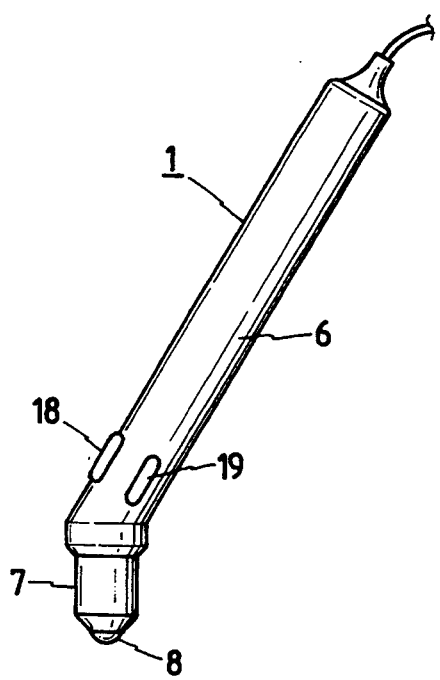
FIG. 2 is an elevational view of the pen-type computer input device shown in FIG. 1.
Figure 3:
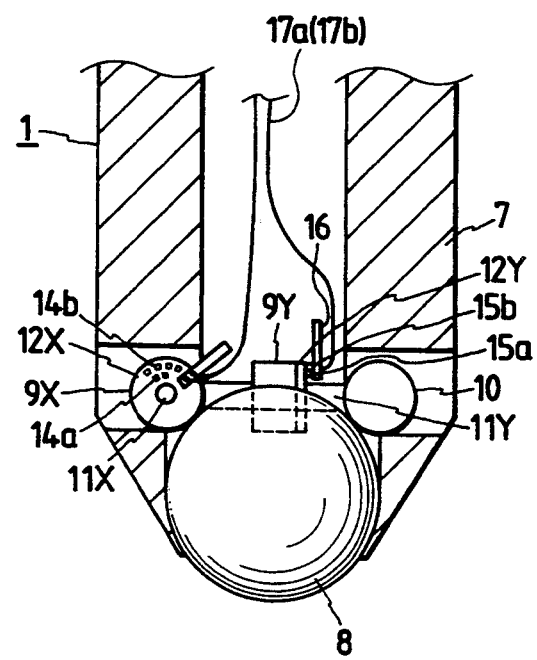
FIG. 3 is an enlarged fragmentary cross-sectional view of the pen-type computer input device according to the first embodiment.

Like or corresponding parts are denoted by like or corresponding reference numerals throughout views.

A pen-type computer input device according to a first embodiment of the present invention will first be described below with reference to FIGS. 1 through 4A and 4B.

As shown in FIG. 1, a pen-type computer input device 1 is connected to a computer 2 which has a display 3. In operation, a free curve 5, which may represent any figure, letter, numeral, or symbol, drawn on a recording sheet 4 by the pen-type computer input device 1 is displayed on the display 3 of the computer 2.

As illustrated in FIGS. 2 through 4A and 4B, the pen-type computer input device 1 comprises a shank 6 including a support 7 on its tip end, a steel ball 8 rotatably supported in the support 7, a pair of ball bearings 9X, 9Y rotatably supported in the support 7 along X and Y axes, respectively, which extend perpendicularly to each other in a plane, and a holding ball 10 rotatably supported in the support 7. The ball bearings 9X, 9Y have inner races mounted respectively on shafts 11X, 11Y whose opposite ends are fixed to the support 7. The ball 8, which partly projects from an open end of the support 7, is rotatably supported by outer races of the ball bearings 9X, 9Y and the holding ball 10 so that the ball 8 can freely and smoothly rotate in any direction. When the pen-type computer input device 1 moves with the ball 8 pressed against the recording sheet 4, the ball 8 rotates, producing an output signal indicative of the direction and distance of the movement of the ball 8. More specifically, the rotation of the ball 8 is divided into vectors along the X and Y axes, which are transmitted to the outer races of the ball bearings 9X, 9Y, thereby rotating these outer races.

Contacts plates 12X, 12Y are coupled respectively to sides of the ball bearings 9X, 9Y for rotation with the outer rings of the ball bearings 9X, 9Y. The contact plates 12X, 12Y are made of an electrically conductive material and electrically connected to the fixed shafts 11X, 11Y and the support 7. The contact plates 12X, 12Y have radially inner and outer recesses 13a, 13b defined in their surfaces along two circumferential concentric patterns or rows and spaced at predetermined equal angular intervals or pitches. Insulating bodies 14a, 14b are embedded respectively in the recesses 13a, 13b at equal circumferential pitches. The radially inner and outer insulating bodies 14a, 14b are angularly displaced from each other by ¼ of their circumferential pitches. In the illustrated embodiment, the radially inner and outer rows of insulating bodies 14a, 14b are 45° displaced from each other since the insulating bodies 14a, 14b divide the circumference into four equal segments. Contacts 15a, 15b are disposed in confronting relation to the radially inner and outer rows of insulating bodies 14a, 14b. The contacts 15a, 15b are supported on a support lever 16 and electrically insulated from each other. Lead wires 17a, 17b are connected respectively to the contacts 15a, 15b. Therefore, an electric circuit is established between the contact plates 12X, 12y and the contacts 15a, 15b. When the ball 8 rotates, the support 7 and the lead wires 17a, 17b are electrically connected intermittently by the insulating bodies 14a, 14b which successively pass into and out of positions between the contact plates 12X, 12Y and the contacts 15a, 15b. Accordingly, pulses, the number of which is commensurate with the angular displacement of the ball 8, can be counted through the lead wires 17a, 17b.

The shank 6 has two input control switches 18, 19 which are positioned near the tip end of the shank 6 so that the switches 18, 19 can easily be operated on by fingers when the shank 6 is gripped by hand.

Operation of the pen-type computer input device 1 will now be described below.

Figure 4A:
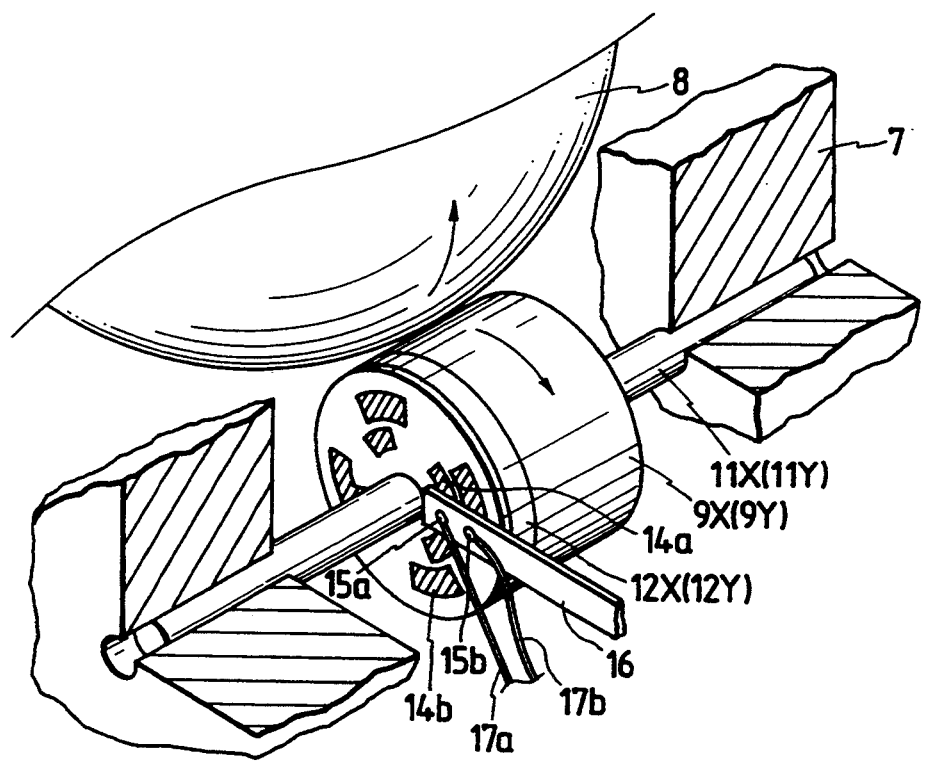
FIG. 4A is an enlarged perspective view, partly broken away, of a rotation detector of the pen-type computer input device according to the first embodiment.
Figure 4B:
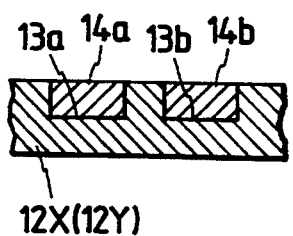
FIG. 4B is an enlarged fragmentary cross-sectional view of a contact plate of the rotation detector shown in FIG. 4A.

The shank 6 of the pen-type computer input device 1 is gripped, and a free curve 5 is drawn on the recording sheet 4 with the pen-type computer input device 1 while the ball 8 is being pressed against the recording sheet 4, as shown in FIG. 1. Since the ball 8 against the recording sheet 4 rotates as this time, one or both of the outer races of the ball bearings 9X, 9Y and the contact plates 12X, 12Y rotate as shown in FIG. 4A. The support 7 and the lead wires 17a, 17b are electrically connected intermittently upon the rotation of the ball 8, as described above. Therefore, the distance which is traversed by the pen-type computer input device 1 on the recording sheet 4 can be measured by detecting and counting pulses thus produced from the lead wires 17a, 17b. Based on the measured distance, the cursor on the display 3 of the computer 2 is moved, displaying a free curve thereon which corresponds to the free curve 5 drawn by the pen-type computer input device 1.

The pen-type computer input device 1 can be used not only to draw curves such as figures, letters, numerals, symbols, or the like, but also to control the cursor displayed on the display 3.

With the above embodiment, the arrangement for detecting the direction and magnitude of movement of the ball 8 is minimized in size. Since the ball bearings 9X, 9Y are available in a diameter of 3 mm, it is possible to incorporate the ball 8 and the rotation detector, which are constructed of the ball bearings 9X, 9Y, etc., in a space having a diameter of 10 mm or less. Therefore, the pen-type computer input device 1 has the ball 8 and the rotation detector mounted in the tip end of the shank 6.

Since the arrangement for detecting the direction and magnitude of movement of the ball 8 is small in size, it can detect very small magnitudes of movement of the ball 8. The pen-type computer input device 1 can easily be handled just like a pen-shaped writing implement. As a result, the pen-type computer input device 1 allows the user to enter various figures, letters, numerals, and other symbols into the computer 2 accurately as desired.

A pen-type computer input device according to a second embodiment of the present invention will be described below with reference to FIGS. 5A, 5B and 6A, 6B.

Figure 5A:
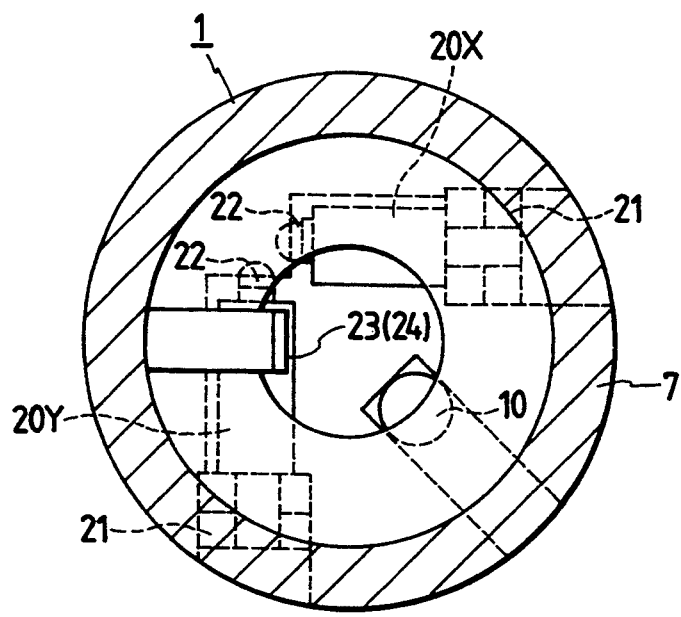
FIG. 5A is an enlarged transverse cross-sectional view of the tip end of a pen-type computer input device according to a second embodiment of the present invention.
Figure 5B:
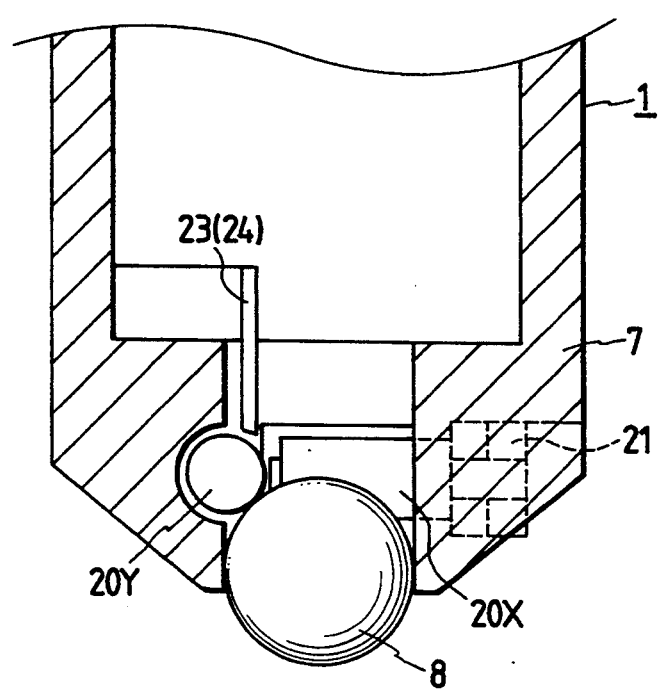
FIG. 5B is an enlarged longitudinal cross-sectional view of the tip end of the pen-type computer input device according to the second embodiment.

As shown in FIGS. 5A and 5B, a pen-type computer input device 1 according to the second embodiment comprises a shank 6 including a support 7 on its tip end, a steel ball 8 rotatably supported in the support 7, a pair of cylindrical conversion output shafts 20X, 20Y rotatably supported in the support 7 along X and Y axes, respectively, which extend perpendicularly to each other in a plane, and a holding ball 10 rotatably supported in the support 7. The conversion output shafts 20X, 20Y have opposite ends rotatably supported by bearings 21 and bearing balls 22. The ball 8, which partly projects from an open end of the support 7, is rotatably supported by conversion output shafts 20X, 20Y and the holding ball 10 so that the ball 8 can freely and smoothly rotate in any direction. When the pen-type computer input device 1 moves with the ball 8 pressed against the recording sheet 4, the ball 8 rotates, producing an output signal indicative of the direction and distance of the movement of the ball 8. More specifically, the rotation of the ball 8 is divided into vectors along the X and Y axes, which are transmitted to the conversion output shafts 20X, 20Y.

Figure 6A:
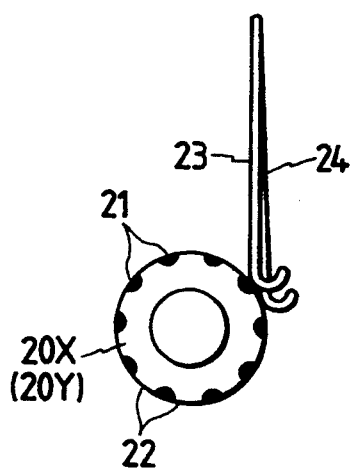
FIGS. 6A and 6B are side and front elevational views, respectively, of a rotation detector of the pen-type computer input device according to the second embodiment.
Figure 6B:
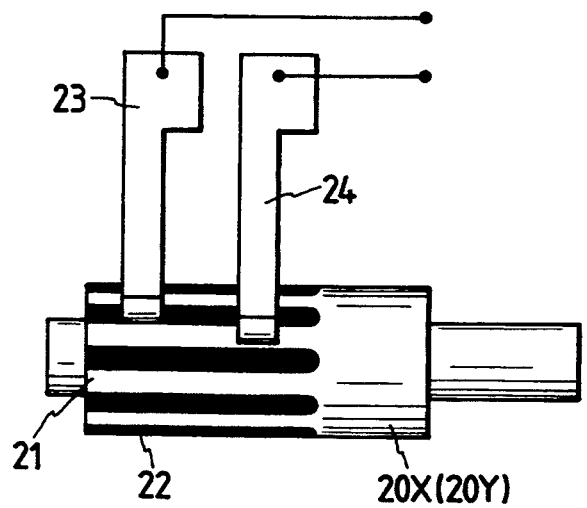

As shown in FIGS. 6A and 6B, the conversion output shafts 20X, 20Y have an axial pattern of rectangular electrically conductive and insulating regions 21, 22 which alternate with each other in the direction in which the conversion output shafts 20X, 20Y rotate. Two brushes 23, 24 are disposed near the pattern of electrically conductive and insulating regions 21, 22. The brushes 23, 24 have tip ends held in sliding contact with the outer circumferential surface of the conversion output shafts 20X, 20Y. The tip ends of the brushes 23, 24 are displaced circumferentially with respect to the conversion output shafts 20X, 20Y such that the brushes 23, 24 are held in contact with the electrically conductive and insulating regions 21, 22, respectively, or vice versa, at a time. The electrically conductive regions 21 may be made of the metallic material of the conversion output shafts 20X, 20Y, whereas the electrically insulating regions 22 may be made of epoxy resin.

The other structural details of the pen-type computer input device according to the second embodiment are identical to those of the pen-type computer input device according to the first embodiment.

The pen-type computer input device 1 according to the second embodiment operates as follows:

When the ball 8 rotates, one or both of the conversion output shafts 20X, 20Y held in rolling contact with the ball 8 rotate. The conversion output shafts 20X, 20Y and the brushes 23, 24 are electrically connected intermittently upon the rotation of the ball 8, as described above. Therefore, the direction and magnitude of movement of the ball 8 along the X and Y axes can be detected by pulses produced from the contacts 23, 24. Based on the detected values, the cursor on the display 3 of the computer 2 is moved, displaying a free curve thereon which corresponds to the free curve 5 drawn by the pen-type computer input device 1.

With the above embodiment, the support 7 may be of an outside diameter of about 14 mm, the ball 8 may be of a diameter of about 5 mm, and the conversion output shafts 20X, 20Y may be of a diameter of about 2 mm. Therefore, the pen-type computer input device 1 may be of a compact structure.

Figure 7A:
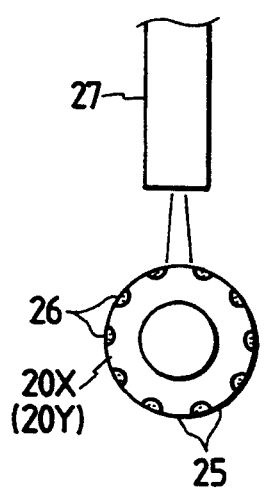
FIGS. 7A and 7B are side and front elevational views, respectively, of a rotation detector of a pen-type computer input device according to a third embodiment of the present invention.
Figure 7B:
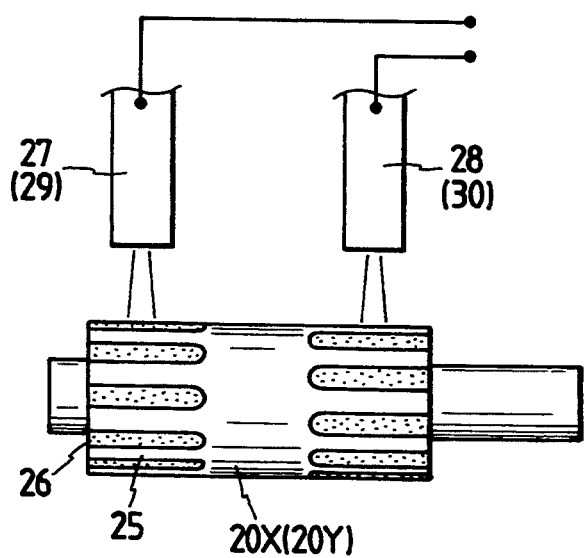

FIGS. 7A and 7B show a rotation detector of a pen-type computer input device according to a third embodiment of the present invention, the rotation detector being usable in the pen-type computer input device 1 shown in FIGS. 5A and 5B.

As shown in FIGS. 7A and 7B, conversion output shafts 20X, 20Y have an axial pattern of rectangular light reflecting regions 25 and rectangular light absorbing regions 26 on each end thereof, the light reflecting and absorbing regions 25, 26 alternating with each other in the circumferential direction of the conversion output shafts 20X, 20Y. The light reflecting and absorbing regions 25, 26 on one end of the conversion output shafts 20X, 20Y are circumferentially displaced from, or out of phase with, those on the other end of the conversion output shafts 20X, 20Y.

It is noted that the "optical fiber light detectors" is accepted by those skilled in this art as meaning a standard light generation and detecting system using optical fibers to transmit the light to an object from which that light is reflected and retransmitted through the same optical fibers to a light detector. An example of such a system is found in U.S. Pat. No. 4,162,399 to Hudson, hereby incorporated by reference. Such systems are well known in this art and can be incorporated in a variety of fashions in the present invention. FIG. 17B illustrates the use of optical fiber elements 27, 28 and 30. Elongated portions of optical fiber elements 27 and 28 are arranged adjacent to the conversion output shaft 20X and an elongated portion of the optical element 30 is arranged adjacent to the conversion output shaft 20Y. The thickened areas of optical fiber elements 27, 28 and 30 can contain the light generating and detection elements or can include additional optical fibers to carry the light to and from the necessary generation and detection elements. Identical or equivalent optical systems for detecting the extent of roller movement are considered well known techniques in this art as illustrated by the similar system found in the Hudson patent, and the optical systems considered usable with the present invention are limited to those found in the Hudson patent and their equivalents.

Optical fiber lightdetectors 27, 28 and 29, 30 which can transmit and receive light are disposed near the patterns of light reflecting and absorbing regions 25, 26 on the respective ends of the conversion output shafts 20X, 20Y. The light reflecting regions 25 may be the lathe-machined surfaces of the conversion output shafts 20X, 20Y themselves, and the light absorbing regions 26 may be stain-finish surfaces produced by processing the surfaces of the conversion output shafts 20X, 20Y with electric discharge machining. Alternatively, the light absorbing regions 26 may be resin fillings in grooves defined in the surfaces of the conversion output shafts 20X, 20Y, or coating layers for reducing light reflections on the surfaces of the conversion output shafts 20X, 20Y.

The other structural details of the pen-type computer input device according to the third embodiment are identical to those of the pen-type computer input device according to the second embodiment.

The pen-type computer input device 1 according to the third embodiment operates as follows:

When the ball 8 rotates, one or both of the conversion output shafts 20X, 20Y held in rolling contact with the ball 8 rotate. The optical fibers light detectors 27, 28 and 29, 30 apply light to the conversion output shafts 20X, 20Y and detect light reflected from the light reflecting regions 25. Based on the detected light, two detected signals are produced and compared in phase by a detecting circuit. In this manner, the directions and magnitudes of rotation of the conversion output shafts 20X, 20Y are detected. Based on the detected values, the cursor on the display 3 of the computer 2 is moved, displaying a free curve thereon which corresponds to the free curve 5 drawn by the pen-type computer input device 1.

As with the first embodiment, since the arrangement for detecting the direction and magnitude of movement of the ball 8 is small in size, it can detect very small magnitudes of movement of the ball 8. The pen-type computer input device 1 can easily be handled just like a pen-shaped writing implement. As a result, the pen-type computer input device 1 allows the user to enter various figures, letters, numerals, and other symbols into the computer 2 accurately as desired.

A pen-type computer input device according to a fourth embodiment of the present invention will be described below with reference to FIGS. 8A, 8B and 9A, 9B.

Figure 8A:
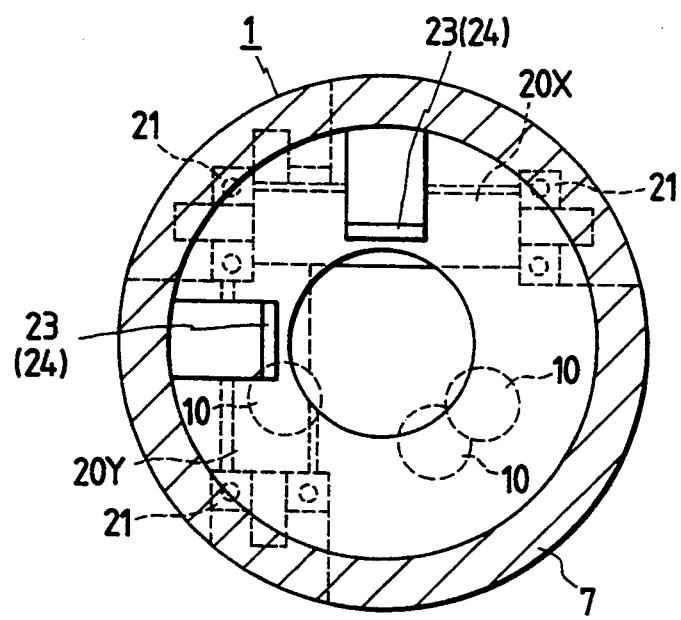
FIG. 8A is an enlarged transverse cross-sectional view of the tip end of a pen-type computer input device according to a fourth embodiment of the present invention.
Figure 8B:
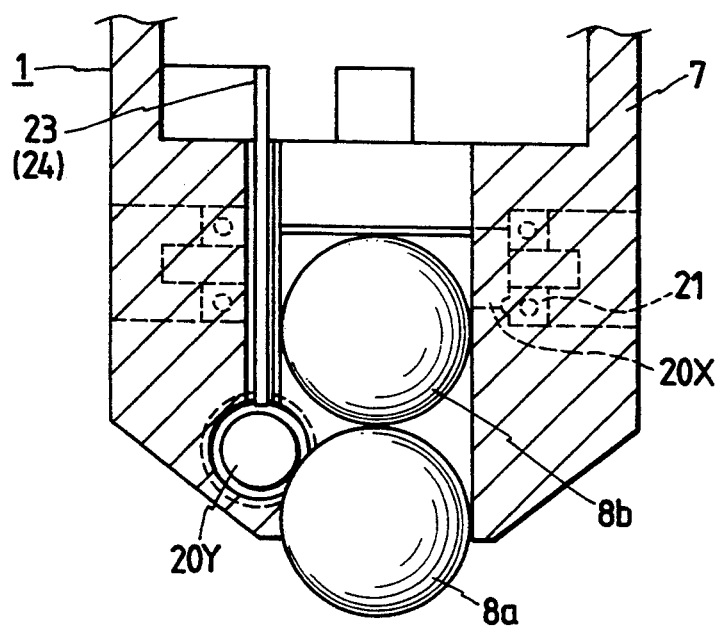
FIG. 8B is an enlarged longitudinal cross-sectional view of the tip end of the pen-type computer input device according to the fourth embodiment.

As shown in FIGS. 8A and 8B, a pen-type computer input device 1 according to the second embodiment comprises a shank 6 including a support 7 on its tip end, a lower steel ball 8a and an upper steel ball 8b rotatably supported in the support 7, a pair of cylindrical conversion output shafts 20X, 20Y rotatably supported in the support 7 along X and Y axes, respectively, which extend perpendicularly to each other in a plane, and a plurality of holding balls 10 rotatably supported in the support 7. The conversion output shafts 20X, 20Y have opposite ends rotatably supported by bearings 21. The lower ball 8a, which partly projects from an open end of the support 7, is rotatably supported by the conversion output shaft 20X and some of the holding balls 10 so that the ball 8a can freely and smoothly rotate in any direction. The upper ball 8b is also rotatably supported by the other conversion output shaft 20Y and the other holding balls 10 so that the ball 8b can freely and smoothly rotate in any direction. When the pen-type computer input device 1 moves with the lower ball 8a pressed against the recording sheet 4, the ball 8a rotates, producing an output signal indicative of the direction and distance of the rotation of the ball 8a. The rotation of the lower ball 8a is transmitted to the upper ball 8b. The rotation of the balls 8a, 8b is transmitted to the conversion output shafts 20Y, 20X, respectively, thus rotating the conversion output shafts 20Y, 20X. As shown in FIGS. 9A and 9B, the rotation of the conversion output shafts 20X, 20Y is detected by the same rotation detector as that shown in FIGS. 6A and 6B.

The other structural details of the pen-type computer input device according to the second fourth are identical to those of the pen-type computer input device according to the second embodiment.

The pen-type computer input device 1 according to the fourth embodiment operates as follows:

When the lower ball 8a rotates, the upper ball 8b also rotates, so that one or both of the conversion output shafts 20X, 20Y held in rolling contact with the respective balls 8a, 8b rotate. The conversion output shafts 20X, 20Y and the brushes 23, 24 are electrically connected intermittently upon the rotation of the balls 8a, 8b. Therefore, the direction and magnitude of movement of the ball 8a along the X and Y axes can be detected by pulses produced from the contacts 23, 24. Based on the detected values, the cursor on the display 3 of the computer 2 is moved, displaying a free curve thereon which corresponds to the free curve 5 drawn by the pen-type computer input device 1.

FIGS. 10A and 10B show a rotation detector of a pen-type computer input device according to a fifth embodiment of the present invention, the rotation detector being usable in the pen-type computer input device 1 shown in FIGS. 8A and 8B.

The rotation detector shown in FIGS. 10A and 10B are identical in structure and operation with the rotation detector shown in FIGS. 7A and 7B, and will not be described in detail below.

Since the arrangement for detecting the direction and magnitude of movement of the ball 8a is small in size according to the fourth and fifth embodiments, it can detect very small magnitudes of movement of the ball 8a. The pen-type computer input device 1 can easily be handled just like a pen-shaped writing instrument. As a result, the pen-type computer input device 1 allows the user to enter various figures, letters, numerals, and other symbols into the computer 2 accurately as desired.

A pen-type computer input device according to a sixth embodiment of the present invention will be described below with reference to FIGS. 11 through 14.

Figure 11:
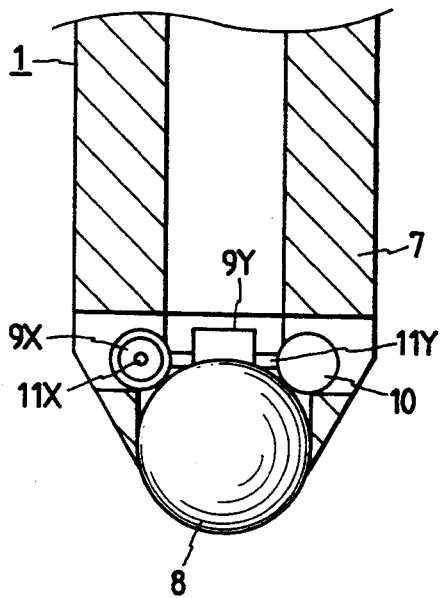
FIG. 11 is an enlarged longitudinal cross-sectional view of the tip end of a pen-type computer input device according to a sixth embodiment of the present invention.

As shown in FIG. 11, a pen-type computer input device 1 according to the sixth embodiment comprises a shank 6 including a support 7 on its tip end, a steel ball 8 rotatably supported in the support 7, a pair of ball bearings 9X, 9Y rotatably supported in the support 7 along X and Y axes, respectively, which extend perpendicularly to each other in a plane, and a holding ball 10 rotatably supported in the support 7. The bearing rollers 9X, 9Y have inner races mounted respectively on shafts 11X, 11Y whose opposite ends are fixed to the support 7. The ball 8, which partly projects from an open end of the support 7, is rotatably supported by outer races of the bearing rollers 9X, 9Y and the holding ball 10 so that the ball 8 can freely and smoothly rotate in any direction. When the pen-type computer input device 1 moves with the ball 8 pressed against the recording sheet 4, the ball 8 rotates, producing an output signal indicative of the direction and distance of the movement of the ball 8. More specifically, the rotation of the ball 8 is divided into vectors along the X and Y axes, which are transmitted to the outer races of the ball bearings 9X, 9Y, thereby rotating these outer races.

Figure 12A:
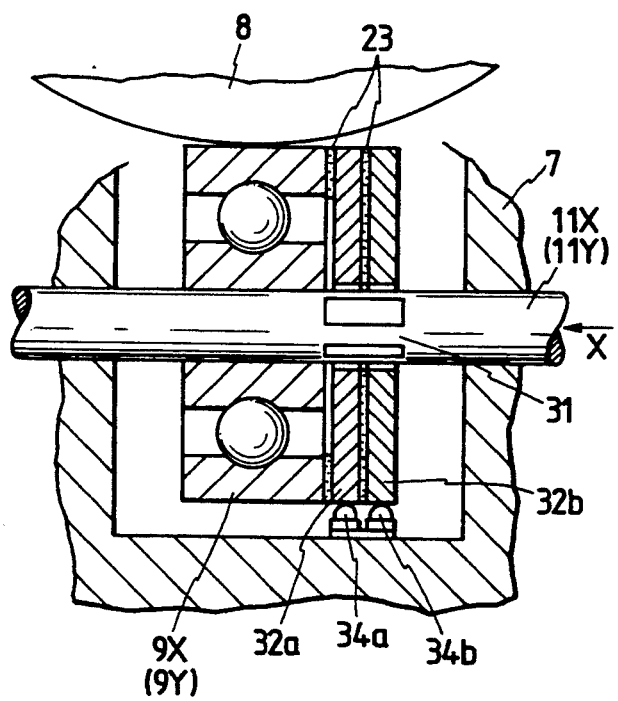
FIG. 12A is an enlarged fragmentary cross-sectional view of a rotation detector of the pen-type computer input device according to the sixth embodiment.
Figure 12B:
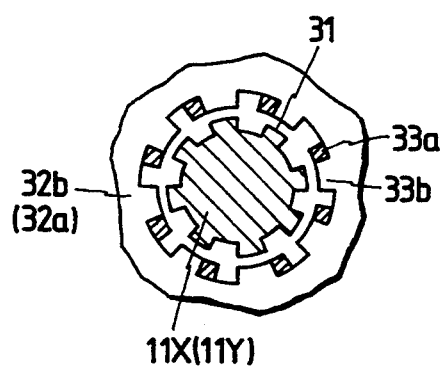
FIG. 12B is a fragmentary view as viewed in the direction indicated by the arrow X in FIG. 12A.

As shown in FIGS. 12A and 12B, the fixed shafts 11X, 11Y each have axial rectangular alternate recesses and ridges 31 formed on the outer circumferential surface thereof and spaced at equal angular intervals (16 intervals in the illustrated embodiment). The recesses and ridges 31 are positioned laterally of the ball bearings 9X, 9Y. Two electrode plates 32a, 32b are successively fixed to one side of the outer race of each of the ball gearings 9X, 9Y through respective electrically insulating plates 33, so that the electrode plates 32a, 32b are rotatable with the outer race of the ball bearing. The electrode plates 32a, 32b are disposed around the recesses and ridges 31 on the fixed shafts 11X, 11Y. The electrode plates 32a, 32b have on their inner circumferential edges alternate recesses and ridges 33a, 33b spaced at the same pitch as the recesses and ridges 31. The ridges 33a, 33b are held out of contact with the ridges 31. The recesses and ridges 33a, 33b of the electrode plates 32a, 32b are 90° out of phase with each other.

Figure 13:
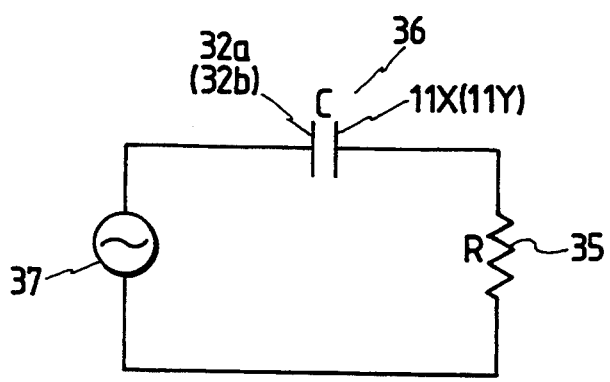
FIG. 13 is a circuit diagram of an equivalent electric circuit of the rotation detector shown in FIG. 12A.

The outer circumferential edges of the electrode plates 32a, 32b are held in sliding contact with contacts 34a, 34b, respectively, mounted in the support 7. Therefore, a capacitor C (FIG. 13) is formed between the electrodes 32a, 32b and the fixed shafts 11X, 11Y, and connected to a detecting circuit shown in FIG. 13. In FIG. 13, a voltage drop developed by a resistor 35 is proportional to the capacitance of the capacitor C and the oscillation frequency of a high-frequency oscillator 37.

Figure 14:
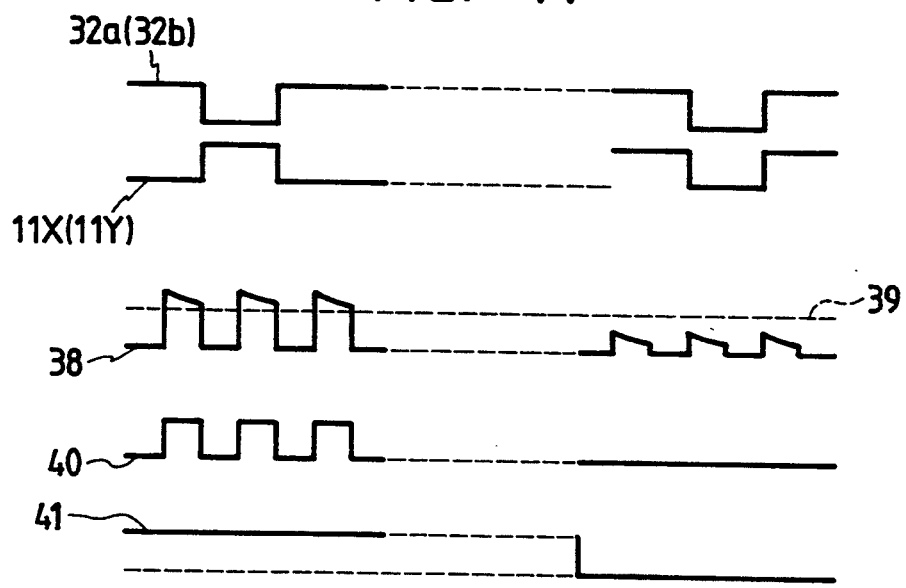
FIG. 14 is a diagram showing signals processed for rotation detection by the rotation detector shown in FIG. 12A.

Signals used to detect rotation of the ball 8 are processed as shown in FIG. 14. Denoted at 32a, 32b are voltages produced by the electrode plates, 11X, 11Y voltages produced by the fixed shafts, 38 a voltage across the resistor 35 shown in FIG. 13, 39 a reference level for comparison with the voltage 38, 40 a signal indicative of the result of comparison between the voltage 38 and the reference level 39, and 41 a pulse signal which is turned on or off depending on whether the signal 40 contains a high-frequency component or not.

Now, operation of the pen-type computer input device according the sixth embodiment will be described below.

When the lower ball 8 rotates, one or both of the outer races of the ball bearings 9X, 9Y and the electrode plates 32a, 32b rotate. The rotation is detected on the basis of the positional relationship between the electrode plates 32a, 32b and the fixed shafts 11X, 11Y, as follows: When the ridges 33a, 33b, 31 of the electrode plates 32a, 32b and the fixed shafts 11X, 11Y face each other, the electrostatic capacitance between these ridges is increased, and hence the voltage 38 across the resistor 35 has a high level which is higher than the reference level 39. As a result, the signal 40 contains a high-frequency component. When the ridges and recesses confront each other, on the other hand, the electrostatic capacitance therebetween is lowered, and the high level of the voltage 38 is also lowered, so that the signal 40 does not contain a high-frequency component, i.e., no signal 40 appears. The pulse signal 41 is turned on and off depending on whether the signal 40 contains a high-frequency component or not. Therefore, the rotation of the electrode plates 32a, 32b, and hence the rotation of the ball 8 can be detected on the basis of the pulse signal 41. Based on the detected values, the cursor on the display 3 of the computer 2 is moved, displaying a free curve thereon which corresponds to the free curve 5 drawn by the pen-type computer input device 1.

Figure 15A:
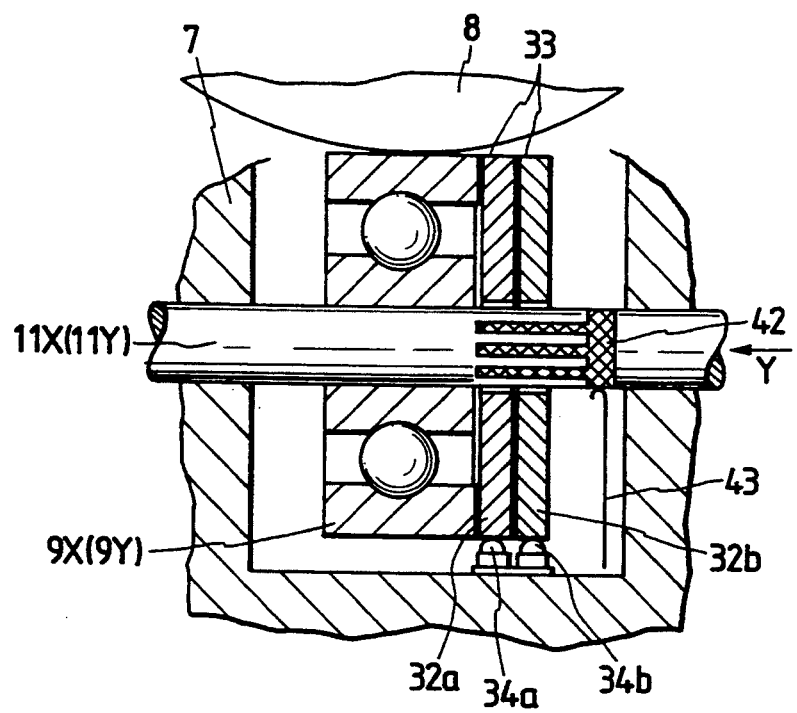
FIG. 15A is an enlarged fragmentary cross-sectional view of a rotation detector of the pen-type computer input device according to a seventh embodiment of the present invention.
Figure 15B:
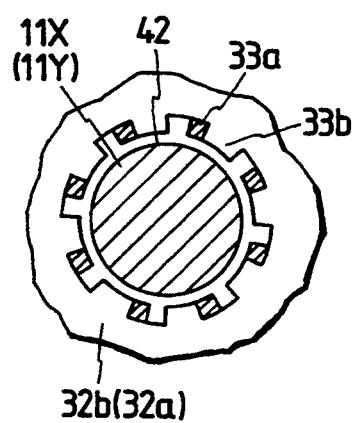
FIG. 15B is a fragmentary view as viewed in the direction indicated by the arrow Y in FIG. 15A.

FIGS. 15A and 15B illustrate a rotation detector of a pen-type computer input device according to a seventh embodiment of the present invention, the rotation detector being usable in the pen-type computer input device shown in FIG. 11.

As shown in FIGS. 15A and 15B, fixed shafts 11X, 11Y are made of an electrically insulating or nonconductive material, and an electrode pattern 42 is mounted on the outer circumferential surface of each of the fixed shafts 11X, 11Y. The electrode pattern 42 has axial electrodes spaced at equal angular intervals (16 intervals in the illustrated embodiment). The electrode pattern 42 is positioned laterally of the ball bearings 9X, 9Y. The electrode plates 32a, 32b have on their inner circumferential edges alternate recesses and ridges 33a, 33b spaced at the same pitch as the electrode pattern 42. The ridges 33a, 33b are held out of contact with the electrode pattern 42. The recesses and ridges 33a, 33b of the electrode plates 32a, 32b are 90° out of phase with each other. The electrode plates 32a, 32b are connected to a detecting circuit (similar to the detecting circuit shown in FIG. 13) through the contacts 34a, 34b, and the electrode pattern 42 is connected to the detecting circuit through a contact 43. The other details of the rotation detector shown in FIGS. 15A and 15B are identical to those of the rotation detector shown in FIGS. 12A and 12B.

Upon rotation of the ball 8, the electrode plates 32a, 32b rotate, and the electrostatic capacitance between the electrode plates 32a, 32b and the fixed shafts 11X, 11Y varies at the pitch of the recesses and ridges 33a, 33b. The electrostatic capacitance which varies in this manner can be detected in the same manner as described above with reference to FIG. 14.

A rotation detector of a pen-type computer input device according to an eighth embodiment of the present invention will be described below with reference to FIGS. 16A through 16C.

Figure 16A:
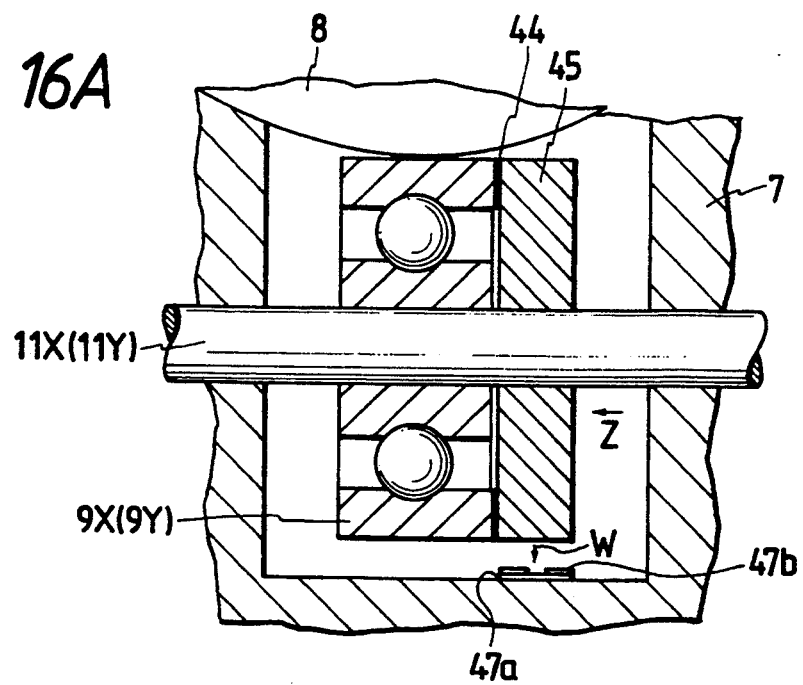
FIG. 16A is an enlarged fragmentary cross-sectional view of a rotation detector of the pen-type computer input device according to an eighth embodiment of the present invention.
Figure 16B:
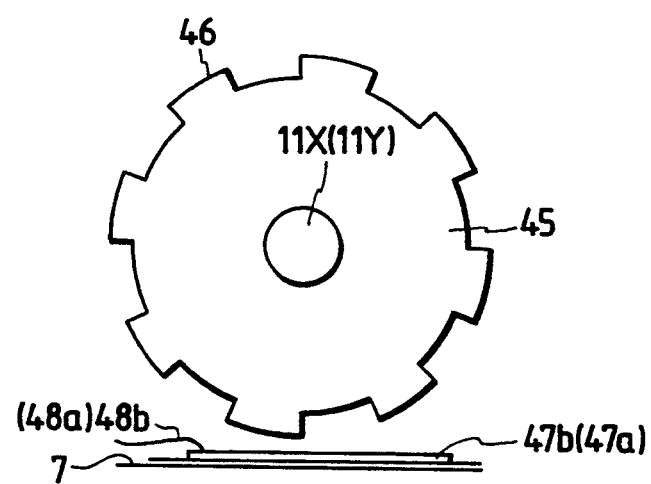
FIG. 16B is an enlarged view as viewed in the direction indicated by the arrow Z in FIG. 16A.
Figure 16C:
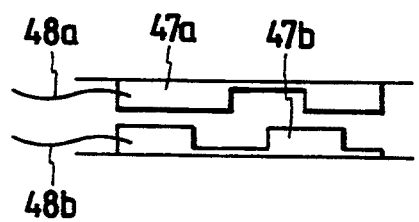
FIG. 16C is an enlarged view as viewed in the direction indicated by the arrow W in FIG. 16A.

As shown in FIGS. 16A and 16B, a single electrode plate 45 is fixed to one side of the outer race of each of the ball bearings 9X, 9Y through an electrically insulating plate 44, so that the electrode plate 45 rotates with the outer race of the ball bearing. The electrode plate 45 has alternate recesses and ridges 46 on its outer circumferential edge at equal intervals (16 intervals in the illustrated embodiment). The support 7 supports electrode patterns 47a, 47b which confront the outer circumferential edge of the electrode plate 45. The electrode patterns 47a, 47b have electrodes spaced at the same pitch as that of the recesses and ridges 46 of the electrode plate 45, and are 90° out of phase with each other. The electrode patterns 47a, 47b are connected to a detecting circuit through lead wires 48a, 48b, respectively. The other details of the rotation detector shown in FIGS. 16A through 16C are identical to those of the rotation detector shown in FIGS. 12A and 12B. When the ball 8 rotates, the electrode plate 45 also rotates, and changes in the electrostatic capacitance between the electrode plate 45 and the electrode patterns 47a, 47b are detected according to the same signal processing as described above with reference to FIG. 14, so that the direction and magnitude of rotation of the ball 8 can be detected.

In the sixth through eighth embodiments, the direction and magnitude of rotation or movement of the ball are detected on the basis of changes in the electrostatic capacitance, as described above. Such an arrangement offers the following advantages: First, since the electrostatic capacitance is in proportion to the area and in inverse proportion to the inter-electrode distance, if the electrode recesses and ridges are spaced at equal intervals, the same changes in the electrostatic capacitance can be detected irrespective of the size of the intervals or pitches of the electrode recesses and ridges. As a consequence, the rotation of the ball can be detected with a very high resolution. Secondly, inasmuch as the structure which supports the electrode recesses and ridges is very simple, the rotation detector may be small in size.

With the sixth through eighth embodiments, as described above, the direction and magnitude of rotation of the ball are detected by transmitting the rotation to the outer races of the ball bearings and detecting the transmitted rotation through changes in the electrostatic capacitance between the electrode plates and the fixed shafts or between the electrode plate and the electrode patterns. Consequently, the rotation detector may be reduced in size and of a higher resolution. The pen-type computer input device can thus detect very small magnitudes of movement, and can also be handled with ease just like a pen-shaped writing implement. The pen-type computer input device allows the user to enter various data such as of figures, letters, numerals, and other symbols into the computer accurately as desired.

A pen-type computer input device according to a ninth embodiment of the present invention will be described below with reference to FIGS. 17A, 17B, and 18.

Figure 17A:
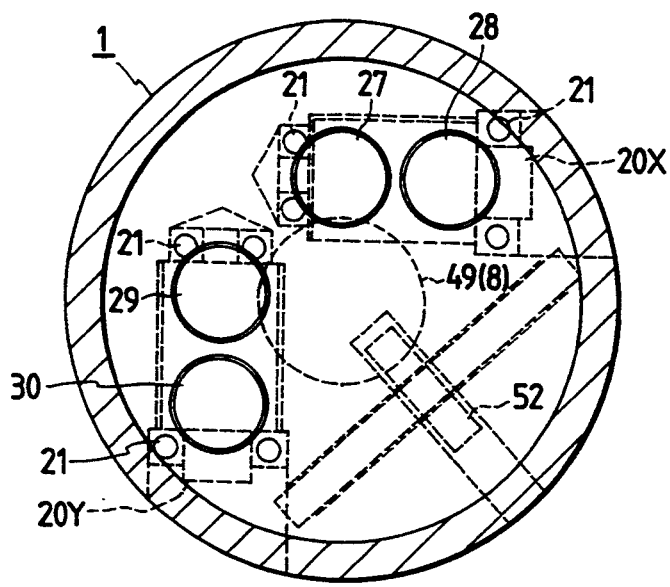
FIG. 17A is an enlarged transverse cross-sectional view of the tip end of a pen-type computer input device according to a ninth embodiment of the present invention.
Figure 17B:
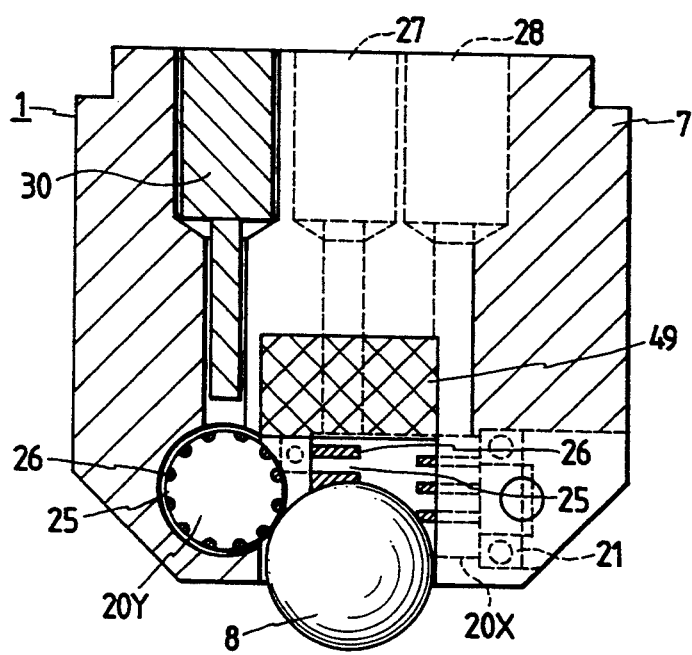
FIG. 17B is an enlarged longitudinal cross-sectional view of the tip end of the pen-type computer input device according to the ninth embodiment.
Figure 18:
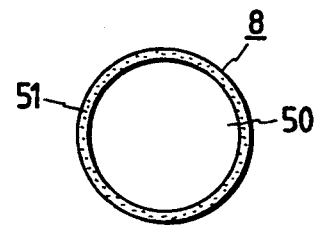
FIG. 18 is a front elevational view, partly in cross section, of a ball in the pen-type computer input device according to the ninth embodiment.

As shown in FIGS. 17A and 17B, a magnet 49 is disposed in the support 7 inwardly of the ball 8. The ball 8 is magnetically attracted into contact with the conversion output shafts 20X, 20Y under magnetic forces from the magnet 49. When the ball 8 rotates, the rotation is transmitted to the conversion output shafts 20X, 20Y, which are then rotated. The ball 8 may comprise a core 50 in the form of a magnetic body such as a steel ball, and an elastic surface layer 51 of rubber or resin covering the core 50, as shown in FIG. 18, or may be made of a mixture of magnetic particles and rubber or resin. Therefore, the ball 8 is reliably held in contact with the conversion output shafts 20X, 20Y under magnetic forces from the magnet 49. The ball 8 is rotatably supported by a bearing 52, rather than holding ball. The other details of the pen-type computer input device shown in FIGS. 17A and 17B are identical to those of the pen-type computer input device according to the third embodiment shown in FIGS. 7A and 7B.

Because the ball 8 is magnetically attracted to the conversion output shafts 20X, 20Y, the rotation of the ball 8 can accurately be transmitted to the conversion output shafts 20X, 20Y. Accordingly, the direction in which the ball 8 rotates and the distance which is traversed by the ball 8 can accurately be detected.

In each of the above embodiments, any noise produced by the ball 8 as it rolls on the recording sheet is reduced.

Although certain preferred embodiments have been shown and described, it should be understood that many changes and modifications may be made therein without departing from the scope of the appended claims.

What is claimed is:

1. A pen-type computer input device comprising:
   a shank having a tip end;
   a ball rotatably supported on said tip end;
   a pair of rotatable members rotatable about X and Y axes extending perpendicularly to each other:
   means for pulling said ball upwards to maintain said rotatable members in rolling contact with said ball independent of pressure on said ball from sources external to said input device; and
   detecting means for detecting the direction in which said rotatable members rotate and the distance by which said rotatable members move.

2. A pen-type computer input device according to claim 1, further including a pair of fixed shafts fixedly mounted in said tip end of the shank, said rotatable members comprise ball bearing outer races rotatably mounted on said fixed shafts, respectively, said detecting means comprising electrically insulating and conductive regions attached to a side of each of said ball bearing outer races and circumferentially spaced at equal intervals, and electric circuit contacts held in sliding contact with said electrically insulating and conductive regions.

3. A pen-type computer input device according to claim 1, wherein said rotatable members comprise cylindrical bodies, said detecting means comprising a pattern of electrically conductive and insulating regions which are alternately formed circumferentially on each of said cylindrical bodies, and two brushes held in alternate contact with said electrically conductive and insulating regions.

4. A pen-type computer input device according to claim 3, wherein said pattern of electrically conductive and insulating regions is disposed on each of said cylindrical bodies at one position thereon, said two brushes being displaced from each other in the circumferential direction of said cylindrical bodies.

5. A pen-type computer input device according to claim 1, wherein said rotatable members comprise cylindrical bodies, said detecting means comprising a pattern of light reflecting and absorbing regions which are alternately formed circumferentially on each of said cylindrical bodies, and optical means having a pair of optical members for each of said cylindrical bodies, each said optical member being arranged to apply light onto said pattern and receive reflected light from said pattern.

6. A pen-type computer input device according to claim 5, wherein said pattern of light reflecting and absorbing regions is disposed on each of said cylindrical bodies at two positions thereon, the patterns at the two positions being out of phase with each other, said optical means being associated with the patterns at the two positions.

7. A pen-type computer input device according to claim 1, further including a second ball held in rolling contact with said first-mentioned ball in rotation transmitting relationship to each other, one of said rotatable bodies being held in rolling contact with one of said balls, the other of said rotatable bodies being held in rolling contact with the other ball.

8. A pen-type computer input device according to claim 7, wherein said rotatable members comprise cylindrical bodies, said detecting means comprising a pattern of electrically conductive and insulating regions which are alternately formed circumferentially on each of said cylindrical bodies, and two brushes held in alternate contact with said electrically conductive and insulating regions.

9. A pen-type computer input device according to claim 8, wherein said pattern of electrically conductive and insulating regions is disposed on each of said cylindrical bodies at one position thereon, said two brushes being displaced from each other in the circumferential direction of said cylindrical bodies.

10. A pen-type computer input device according to claim 7, wherein said rotatable members comprise cylindrical bodies, said detecting means comprising a pattern of light reflecting and absorbing regions which are alternately formed circumferentially on each of said cylindrical bodies, and two optical fiber light detectors for alternately applying light and receiving reflected light from said light reflecting and absorbing regions.

11. A pen-type computer input device according to claim 10, wherein said pattern of light reflecting and absorbing regions is disposed on each of said cylindrical bodies at two positions thereon, the patterns at the two positions being out of phase with each other, said optical fiber light detectors being associated with the patterns at the two positions.

12. A pen-type computer input device according to claim 1, wherein said detecting means comprises a pair of fixed shafts fixedly mounted in said tip end of the shank, said fixed shafts being made of an electrically conductive material and having recesses and ridges formed on outer circumferential surfaces thereof at equal intervals, at least two electrodes disposed on said rotatable members, said electrodes having recesses and ridges held out of contact with and confronting the recesses and ridges on said fixed shafts, said recesses and ridges of said electrodes being spaced at equal intervals and kept out of phase with each other, and means for detecting a change in electrostatic capacitance between said fixed shafts and said electrodes thereby to determine the direction in which said rotatable members rotate and the distance by which said rotatable members move, whereby the distance by which said ball moves can be detected.

13. A pen-type computer input device according to claim 1, wherein said detecting means comprises a pair of fixed shafts fixedly mounted in said tip end of the shank, said fixed shafts being made of an electrically nonconductive material and having respective electrode patterns composed of electrodes disposed on outer circumferential surfaces thereof, at least two electrodes disposed on said rotatable members, said electrodes having recesses and ridges held out of contact with and confronting the electrode patterns on said fixed shafts, said recesses and ridges of said electrodes being spaced at equal intervals and kept out of phase with each other, and means for detecting a change in electrostatic capacitance between said fixed shafts and said electrodes thereby to determine the direction in which said rotatable members rotate and the distance by which said rotatable members move, whereby the distance by which said ball moves can be detected.

14. A pen-type computer input device according to claim 1, wherein said rotatable members are made of an electrically conductive material, said detecting means comprising recesses and ridges formed on outer circumferential surfaces of the rotatable members at equal intervals, at least two electrodes confronting the recesses and ridges on said rotatable members, said recesses and ridges of said electrodes being spaced at equal intervals and kept out of phase with each other, and means for detecting a change in electrostatic capacitance between said rotatable members and said electrodes thereby to determine the direction in which said rotatable members rotate and the distance by which said rotatable members move, whereby the distance by which said ball moves can be detected.

15. A pen-type computer input device comprising:
a shank having a tip end;
a ball rotatably supported on said tip end;
a pair of rotatable members rotatable about X and Y axes extending perpendicularly to each other;
means for pulling said ball upwards to maintain said rotatable members in rolling contact with said ball independent of pressure on said ball from sources external to said input device; and
detecting means for detecting the direction in which said rotatable members rotate and the distance by which said rotatable members move;
wherein said means for pulling comprises magnetic attracting means for attracting said ball to said rotatable members.

16. A pen-type computer input device according to claim 15, wherein said ball comprises a magnetic core and a surface layer of rubber or resin covering said core.

17. A pen-type computer input device according to claim 15, wherein said ball is made of a mixture of magnetic particles and rubber or resin.

18. A pen-type computer input device according to claim 15, wherein said rotatable members comprise cylindrical bodies, said detecting means comprising a pattern of light reflecting and absorbing regions which are alternately formed circumferentially on each of said cylindrical bodies, and optical means having a pair of optical members for each of said cylindrical bodies, each said optical member being arranged to apply light onto said pattern and receive reflected light from said pattern.

19. A pen-type computer input device according to claim 18, wherein said pattern of light reflecting and absorbing regions is disposed on each of said cylindrical bodies at two positions thereon, the patterns at the two positions being out of phase with each other, said optical means being associated with the patterns at the two positions.

* * * * *